US010817662B2

(12) United States Patent
Yawn

(10) Patent No.: US 10,817,662 B2
(45) Date of Patent: Oct. 27, 2020

(54) EXPERT SYSTEM FOR AUTOMATION, DATA COLLECTION, VALIDATION AND MANAGED STORAGE WITHOUT PROGRAMMING AND WITHOUT DEPLOYMENT

(71) Applicant: CLIXLEX GROUP, LLC, New York, NY (US)

(72) Inventor: Richard Yawn, Freehold, NJ (US)

(73) Assignee: KIM TECHNOLOGIES LIMITED, Wirral (GB)

( * ) Notice: Subject to any disclaimer, the term of this patent is extended or adjusted under 35 U.S.C. 154(b) by 275 days.

(21) Appl. No.: 14/283,548

(22) Filed: May 21, 2014

(65) Prior Publication Data

US 2014/0351686 A1 Nov. 27, 2014

Related U.S. Application Data

(60) Provisional application No. 61/825,612, filed on May 21, 2013.

(51) Int. Cl.
*G06F 40/186* (2020.01)
*G06F 40/14* (2020.01)
*G06F 40/226* (2020.01)
*H04L 29/08* (2006.01)

(52) U.S. Cl.
CPC ............ *G06F 40/186* (2020.01); *G06F 40/14* (2020.01); *G06F 40/226* (2020.01); *H04L 67/02* (2013.01)

(58) Field of Classification Search
CPC .................................................. G06F 17/3089
USPC ................................................ 715/230, 234
See application file for complete search history.

(56) References Cited

U.S. PATENT DOCUMENTS

| | | | |
|---|---|---|---|
| 6,330,717 B1 | 12/2001 | Raverdy et al. | |
| 6,535,883 B1 | 3/2003 | Lee et al. | |
| 7,010,746 B2* | 3/2006 | Purvis | G06F 17/211 715/249 |
| 7,171,617 B2* | 1/2007 | Harrington | G06Q 10/04 345/619 |
| 7,225,401 B2* | 5/2007 | Purvis | G06F 17/243 707/999.001 |

(Continued)

FOREIGN PATENT DOCUMENTS

EP 2782023 A2 9/2014

OTHER PUBLICATIONS

Aven, "Enriching Word Documents with <w:customXml>," 2008, available at: https://developer.marklogic.com/blog/smallchanges/2008-01-08.*

(Continued)

*Primary Examiner* — Andrew R Dyer
(74) *Attorney, Agent, or Firm* — DLA Piper LLP US

(57) ABSTRACT

The system and method are disclosed for converting an XML-based format document (e.g., DOCX) into a template that can be stored, accessed, and/or populated using web services. The XML-based format document can include content control tags that can be converted to XML elements and/or scheme information. Further, a unique ID can be assigned to the XML-based format document and the document can be stored as a template associated with the unique ID. A web service can respond to the document ID, apply the scheme information for the document (validate the data), and populate the control tags using XML elements received from another computer.

18 Claims, 12 Drawing Sheets

(56) References Cited

U.S. PATENT DOCUMENTS

| | | | |
|---|---|---|---|
| 7,313,757 B2* | 12/2007 | Bradley | G06F 40/151 |
| | | | 715/222 |
| 7,451,140 B2* | 11/2008 | Purvis | G06F 17/248 |
| 7,774,791 B1 | 8/2010 | Appelbaum et al. | |
| 7,844,897 B1* | 11/2010 | Cooley | G06F 17/248 |
| | | | 715/234 |
| 7,882,131 B2 | 2/2011 | Kim | |
| 7,882,149 B2* | 2/2011 | Foster | G06F 16/88 |
| | | | 707/803 |
| 7,970,862 B2 | 6/2011 | Connor et al. | |
| 7,992,127 B2 | 8/2011 | Loupia et al. | |
| 8,032,644 B2 | 10/2011 | Larvet | |
| 8,046,441 B2 | 10/2011 | Banerji et al. | |
| 8,086,951 B2 | 12/2011 | Kopp et al. | |
| 8,200,714 B2* | 6/2012 | Schwartz | G06F 40/14 |
| | | | 707/803 |
| 8,230,353 B2 | 7/2012 | Cruz et al. | |
| 8,370,903 B2 | 2/2013 | Teramoto et al. | |
| 8,539,061 B2 | 9/2013 | Shi | |
| 8,549,162 B2 | 10/2013 | Matsushima | |
| 8,572,157 B2 | 10/2013 | Bouw et al. | |
| 8,572,494 B2 | 10/2013 | Kuehner et al. | |
| 8,627,345 B2 | 1/2014 | Malik et al. | |
| 8,687,219 B2 | 4/2014 | Sato | |
| 8,711,396 B2 | 4/2014 | Tian | |
| 8,711,410 B2 | 4/2014 | Homma | |
| 9,152,619 B2* | 10/2015 | Meschkat | G06F 17/248 |
| 9,558,164 B1* | 1/2017 | Sevrinsky | G06F 17/227 |
| 2002/0107881 A1* | 8/2002 | Patel | H03M 7/30 |
| | | | 715/273 |
| 2004/0181527 A1 | 9/2004 | Burdick et al. | |
| 2004/0193635 A1* | 9/2004 | Hsu | G06F 9/5027 |
| 2004/0255245 A1* | 12/2004 | Yamada | G06F 17/212 |
| | | | 715/246 |
| 2004/0268306 A1* | 12/2004 | Cheng | G06F 17/2247 |
| | | | 717/114 |
| 2005/0022115 A1* | 1/2005 | Baumgartner | G06F 16/9535 |
| | | | 715/205 |
| 2006/0155725 A1 | 7/2006 | Foster et al. | |
| 2007/0112810 A1* | 5/2007 | Jonsson | G06F 40/154 |
| 2008/0141117 A1 | 6/2008 | King et al. | |
| 2008/0168345 A1* | 7/2008 | Becker | G06F 16/986 |
| | | | 715/242 |
| 2009/0254806 A1* | 10/2009 | Bitonti | G06F 40/14 |
| | | | 715/234 |
| 2010/0094913 A1* | 4/2010 | Connor | G06F 17/30864 |
| | | | 707/803 |
| 2010/0121923 A1* | 5/2010 | Cvetkovic | G06F 16/00 |
| | | | 709/206 |
| 2011/0060767 A1* | 3/2011 | Agarwal | G06F 17/2247 |
| | | | 707/803 |
| 2014/0324416 A1 | 10/2014 | Lapshin | |

OTHER PUBLICATIONS

International Search Report issued in PCT/US2017/052044 dated Jan. 17, 2018.

Written Opinion issed in PCT/US2017/052044 dated Jan. 17, 2018.

U.S. Appl. No. 15/707,535.

* cited by examiner

![CliXLEX New Filing Submission screen]

CliXLEX™
Create | Connect | Store | Order adam.jones@clixopenxml.com  sign out
messages (0)  change password
(Adam Jones)

HOME    CONTACT    LIBRARY    HELP    DASHBOARD    TEMPLATES    ACCOUNT

New Filing Submission   ← 119

Submit a New Filing | Search Filings & View Filing Status | Select Templates to Create New Filings First, Download Filing Templates approved for this account and fill content with a DocX Compliant Editor. Templates are only required to be down loaded once unless notified of new versions. When working with templates on your local drive, it's best practice to work with each case filing in a separate directory.

*Step 1 – Upload DocX Filing*

Filing: [          ]  [ Browse... ]   [ Upload ]

*Step 2 – Select Destination*
*Step 3 – Select Attachments (required attachments must be uploaded)*
*Step 4 – Enter Case Identification*
*Step 5 – Select Representing Organization & Authorization Account*
*Step 6 – Optional Notification*
*Step 7 – Acknowledge & Submit*

[ Submit Filing ]

Filing Submission Terms & Conditions
☐ I [Unknown] Agree to Payment Terms and Conditions Copyright © 2012 – 2013 All Rights Reserved www.clixdext.com  ToS  Privacy Policy

FIG. 8

Document Generator

116

Retrieve set of process ids that are not processed and not in process

Transform the data into a PDF

CliXLEX Ascent E-Filing Upload Utility

CliXLEX Ascent
Batch Submission Utility

Username
Password
Login

| Setup | Activity | Logging |

- You must login with a CliX Integrator Account to Run Ascent
- Directory C:\CLIXIO\FileUploadProcessor must exist for Ascent to function (sub folders will be created automatically)
- Drop files into "C:\CLIXIO\FileUploadProcessor\Staged directory to be picked up for processing

*(Set Service Key and Account Id for Scanning to Begin)*

Service Key [        ]   Account Id [    ]   Set Key and Account

120

Copyright @ 2012 – 2013 All Rights Reserved www.clixdex1.com ToS Privacy Policy

FIG. 11

EXPERT SYSTEM FOR AUTOMATION, DATA COLLECTION, VALIDATION AND MANAGED STORAGE WITHOUT PROGRAMMING AND WITHOUT DEPLOYMENT

CROSS-REFERENCE TO RELATED APPLICATION

The present application is a continuation of U.S. Provisional Patent Application No. 61/825,612, filed on May 21, 2013, the disclosure of which is incorporated herein by reference.

FIELD

The present disclosure relates to systems and methods for converting XML-based format documents into a common form that generates a number and stores the XML format by and with that number that is then able to be referenced by a single data submission web service that adapts to the XML elements as a formatted interface that collects, validates and stores information for each machine to machine or human to machine conversation that occurs for the specified template number.

BACKGROUND

Some have found web services to be a useful method of communication between two electronic devices over the World Wide Web. Generally speaking, web services provides a standardized method of integrating web-based applications over an Internet protocol backbone. Web services can utilize Extensible Markup Language (XML), Simple Object Access Protocol (SOAP), Web Services Description Language (WSDL), and/or Universal Description Discovery and Integration (UDDI). XML can be used to tag the data. SOAP can be used to transfer the data. WSDL can be used for describing the services available. UDDI can be used for listing what services are available.

In practice, unlike traditional client/server models (e.g., a web server/web page system), web services, typically, do not provide the user with a graphical user interface (GUI). Rather, web services share business logic, data, and processes through a programmatic interface across a network. In other words, applications interface, not the users. Developers can add the web service to a GUI (e.g., web page, executable program, application, etc.), for example, to offer specific functionality to users.

Beneficially, web services can allow different applications from different sources to communicate with each other and with all communication in XML, web services can remain untied to any one operating system and/or programming language. For example, JAVA can talk with PERL, WINDOWS applications can talk with UNIX applications, etc. And, web services, typically, does not require the use of browsers or HTML.

Using web services, electronic devices can communicate information such as information related to financial transactions, legal transactions, medical transactions and transactions for many other industries. To use web services, each transaction may be enabled with a dedicated web service and each web service may be different and unique by name, the number of fields and the type of information being passed such as letters or numbers.

Although useful, each web service may be required to be programmed by a highly skilled person with knowledge of how web services work. Programming web services can require design, development, planning, and deployment. These processes of developing and maintaining web services can be substantially expensive, take substantial amounts of time, and/or web services can be substantially hard to manage as more and more web services are created.

BRIEF DESCRIPTION OF THE DRAWINGS

The features and advantages of the present disclosure will be more fully understood with reference to the following detailed description when taken in conjunction with the accompanying figures, wherein:

FIGS. 5-12 illustratively depict user interfaces, in accordance with exemplary embodiments of the present disclosure.

DETAILED DESCRIPTION

Figure 1:
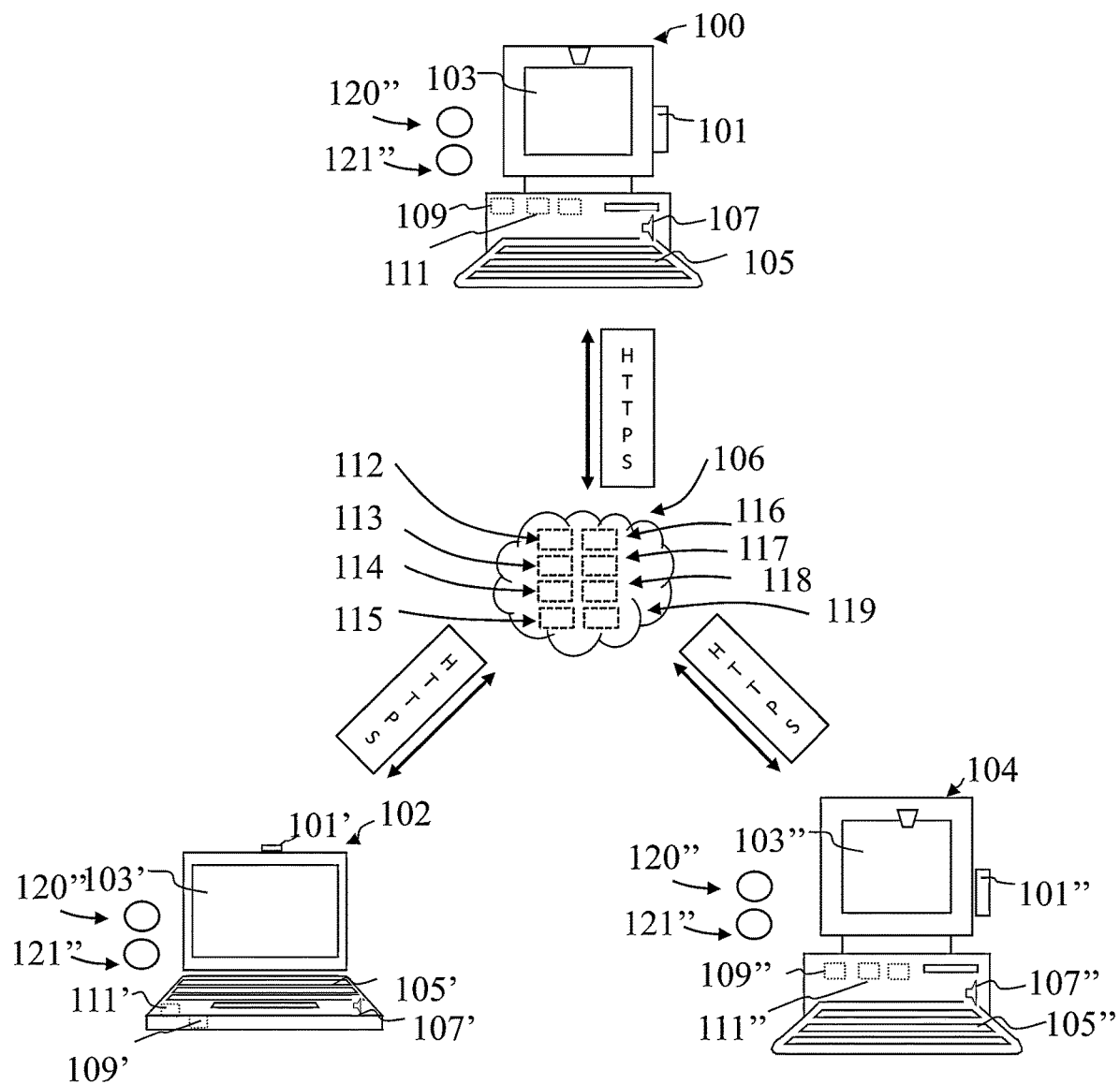
FIG. 1 is a block diagram of certain components of the systems and methods for converting any XML-based format document according to specification into a template that is used to provide instructions to a single data submission web service that adapts to any template's data specification whereby the data submission web service is able to validate and store information for that template without programming in accordance with exemplary embodiments of the present disclosure.

The disclosure generally relates to systems and methods for knowledge workers within each knowledge worker's domain of expertise to apply sets of data tagging formats to templates (e.g. DOCX) for the purpose of enabling web service integration to the invention with data collection, validation and storage capabilities without programming and without deployment.

Each template may contain different data tagging sets with each data tag known as an element that when applied (uploaded) to the invention reads each element and infers placement on a base structure, produces a mapped path to the base structure for each element and in whole produces a common XML format that is semantically the same as any other XML format within the invention with the only difference being the name, placement, number of elements and number of paths for each new XML format following the common schema. Further, a unique ID is assigned to the scheme and stored with the scheme as that scheme's unique ID. Throughout this invention's writing the scheme's unique ID will be referred to as scheme ID. With each DOCX template uploaded to the invention, the invention gains additional knowledge by learning the structural composition of each template and is able to interface with any authenticated and authorized client over HTTPS with an artificially intelligent understanding of the correctness of the data being supplied for that scheme ID.

The knowledge worker is then able to locate the scheme within the invention and apply further data validation that specifies whether the data is required within the structural scheme for that element, whether the data matches a pattern within the structural scheme for that element, whether the data conforms to a maximum length within the structural scheme for that element, whether the data is within a range of limits within the structure scheme for that element, whether the data is allowed to occur more than once within the structural scheme for that element and whether the data within the structural scheme for that element is redacted when a PDF document is produced from the unique data that was passed through the submission web service 112 for that XML by combining both the XML and the DOCX template that the knowledge worker uploaded for that scheme ID. The data validation may be referenced by the invention as each data validation rule generates a unique Id that is stored along with the element name, rule and the scheme Id for each validation. Throughout this invention's writing the data validation unique ID will be referred to as data validation ID.

The knowledge worker is then able to locate the scheme within the invention and apply further validation that specifies whether attachments are permitted to be submitted along with the data, whether each attachment is required or optional and the accepted file formats for each attachment. Throughout this invention's writing the attachment validation unique ID will be referred to as attachment validation ID.

The invention is able to locate the scheme by scheme ID when requested by the submission web service. The submission web service 112 begins by validating that the requester of the submission web service 112 is permitted to make request. The invention then references the account ID and verifies that the username is authorized to utilize schema ID for that account ID. The invention first attempts to locate and retrieve schema, data validation rules and attachment rules from cache by schema ID. If schema, data validation rules and attachment rules are not located within cache, the invention will locate the schema, data validation rules and attachment rules from storage by schema ID and load into cache. Once retrieved, the invention compares the structural schema to the data structure being submitted through the submission web service 112, locates the validation rules by scheme ID and utilizes the paths from the schema to disassemble the data structure passed from the request and captures each individual entry and validates each entry against the validation rule for that structural name according to each validation rule applied for each element. The invention then locates the attachment rules by unique ID and evaluates the attachment structure of the submission web service 112 for comparison against attachment name, required rule and accepted file format rules. If all validation passes, the invention generates a unique ID for that unique data submitted for that data submission web service 112 request and stores the data along with the username that made the request, date of the request, schema ID and account ID. The unique ID generated for that data will be referenced in this invention's writings as submission ID.

The invention then records the request along with username, date, schema ID and account ID as not processed and not received and generates a unique process ID.

The invention's document generation 116 agent is then polling the processes ID and retrieving process IDs for submission IDs that are not yet processed. The invention's document generation agent will then retrieve the submission ID's data, the schema ID's template and the schema ID's common XML structure. The data will be retrieved from the data's structure by referencing the common XML structure's map and locating the element by element name and retrieving the unique data from the element. Then the template is referenced by locating the location by map ID and placing the data from the element in that template's content control placeholder. The validation rules are then retrieved for that schema ID, and the redaction rule is read to determine if the data should appear on the output document as redacted. If the rule identifies for that data to be redacted, the data is replaced on the content control with solid filled blocks for each character in the data, while the underlying XML data remains unchanged. The occurrence rule is then referenced for many data that may appear more than once. If the data exists within the XML more than once and the occurrence rule allows appearance to occur more than once, then the structure of element is copied and inserted immediately after the current occurrence and before any next difference occurrence and the data is strung together as a list while maintaining the physical structure of the template. Once all data has been applied from the XML to the template, the template is saved to a DOCX Document utilizing the OpenXML save as command. The DOCX Document is then submitted to Aspose and requested that the DOCX Document be converted to PDF. Once the DOCX Document converts to PDF, the invention then updates the process ID as processed and updates the submission ID's PDF document content.

The invention allows the invention's site administrators to identify locations by name, address, city, state, zip and country. When this information is entered into the invention, a unique ID is generated. This unique ID will be referenced throughout this writing as location ID. The invention's site administrators may also authorize usernames that may request processed data by location ID.

Once data has been collected, validated and processed by the invention, requests to the invention's retrieval web service 113 will locate sets of processed requests when requested by an authorized user for specific location ID's. The invention's retrieval web service 113 begins by validating that the requester of the retrieval web service 113 is permitted to make request. The invention then references the account ID and verifies that the username is authorized to utilize location ID for that account ID. The invention then retrieves zero to no more than 15 processed requests of information for those processed IDs that have not been received and are not in process. Each set within the retrieval contains location information, XML data received by the submission web service 112, generated PDF document and the scheme that was used for processing. The request sets are then marked for each process ID for data that is in process. The invention will package location information, XML data received during the web service submission, attachments and the generated PDF for each processed request into a collection of all retrieved sets up to a maximum of 15 sets.

Once processed requests have been successfully retrieved by a client, the client may respond to the invention's receipt web service 114 with those process IDs that were in process. The invention will mark those process IDs as not in process, has been received, with the username that received the processed requests and the location where the username placed the processed request packages.

The invention's retrieval web service 113 may be requested up to every 30 seconds for each location ID to retrieve processed requests.

The invention's update case ID web service 115 may optionally be requested with a submission to update the process ID's case ID with a new value. This operation will only succeed if the case ID for that process ID does not contain a value.

The invention provides a view of the status and the content of web service submissions. This view is referenced throughout this invention's writing as the dashboard 117. The dashboard 117 requires the username and the username's selected account ID to retrieve status, username, date, XML submission data and PDF for submission IDs in combination with process IDs for the username and account ID making the request. The dashboard 117 request locates all records for that username for the selected account ID and locates the username's authorization record to determine if that username is an administrator. For administrators, all submission IDs and process IDs are retrieved up to 200 across usernames. For usernames making requests that are not administrators, all submission IDs and process IDs are retrieved up to 200 for that username.

Figure 7:
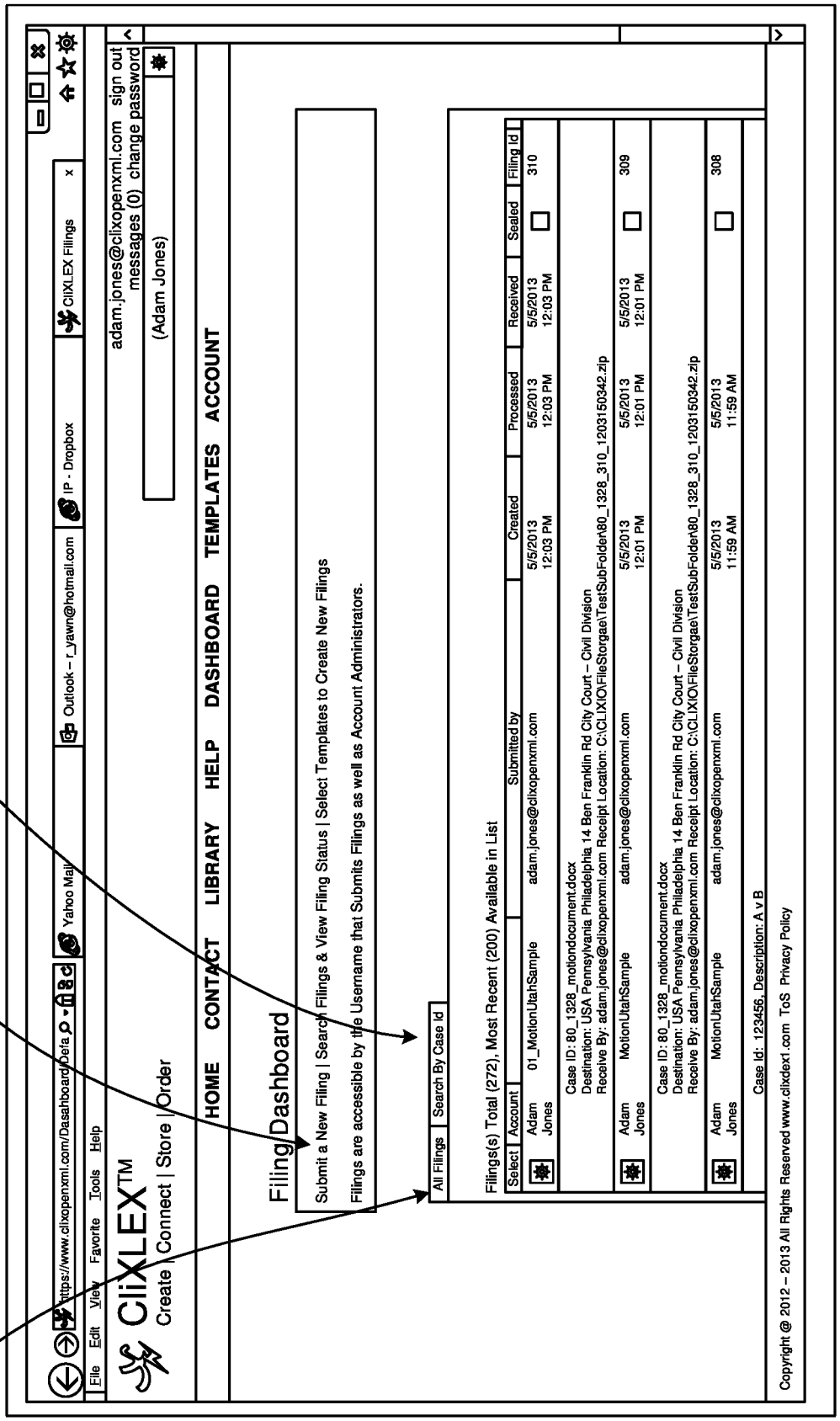
Figure 9:
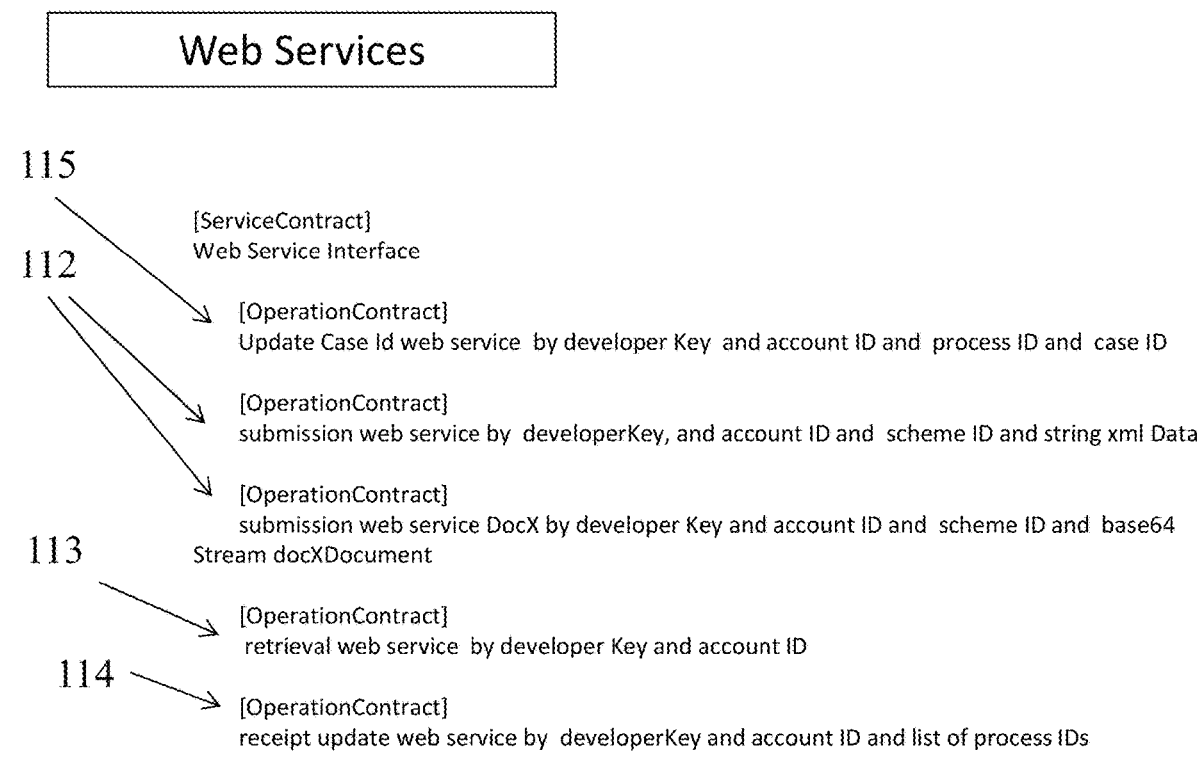
Figure 10:

Alternately, referring to FIG. 7, the invention provides a secondary dashboard 118 view that retrieves submission IDs and process IDs by case ID. This view will follow all the rules above with an additional constraint to retrieve by also filtering from the case ID.

Alternately, the invention may introduce web service submissions by passing DOCX documents in place of XML for a specific scheme ID. The DOCX document must be passed to the invention through the submission web service 112 by way of a base64 stream. The invention will detect DOCX document by file extension. When DOCX document is detected by the invention, the invention will locate the scheme ID and locate the common XML format for that submission. The invention will then convert the base64 stream into an XML document. The invention will then run through the document in the same manner as the invention learns a template. This run instead of inferring the structure will retrieve the data from the document, reference the maps for the element name and transfer the data from the DOCX document into the common XML for that scheme ID. Once the common XML format is populated, the invention will respond the same as described above.

Alternately, referring to FIG. 8, the dashboard 119 provides additional capability whereby allowing users to manually upload DOCX documents directly to the invention from a web page. The invention will use the web services on behalf of the user. Upon user upload of DOCX document, the invention will respond with detailed description and then respond the same as described above.

Alternately, referring to FIG. 11, web service submissions may occur on behalf of users with Ascent 120. Ascent 120 is an agent that orchestrates the web service submission process on behalf of a client. The client must follow Ascent's file name conventions and the invention will respond the same as described above.

Figure 12:

Alternately, referring to FIG. 12, web service retrievals may occur on behalf of user with Descent 121. Descent 121 is an agent that orchestrates web service retrieval process on behalf of a client which is detailed above.

In exemplary embodiments, the systems and methods can be used to simplify and/or decrease the amount of effort to develop and/or the amount of effort to manage web services. Utilizing the systems and methods web service automation can be created substantially quickly by users who may have no web services programming or web services deployment experience.

In exemplary embodiments, the systems and methods can provide the capability to automate data collection, validation and storage through an on demand web service and/or manage with little effort.

By way of example, using a word processor that supports DOCX with content controls, a user can place content controls tags in the DOCX document and then upload the DOCX document into the system disclosed. The systems and methods include a single web service that can be able to understand the instructions of all uploaded DOCX and treat each DOCX as if it were a unique web service. Accordingly, the systems and methods provide a web service that can be immediately available and/or managed by the systems and methods such that the user may only need to manage the DOCX template.

In exemplary embodiments, the systems and methods can utilize a web service and information from an XML-based format file. The XML-based format can be any document such as, but not limited to, spreadsheets, charts, presentations, word processing documents, XLSX, PPTX, and DOCX, to name a few. For ease, the disclosure may, at times, refer to only one XML based format such as DOCX. This is merely for ease and is in no way meant to be a limitation.

Referring to FIG. 1, in exemplary embodiments, it will be understood that the systems and methods can include and or utilize at least a web service system 302, users computer 322, and/or additional users computer 330 that can communicate with each other, for example, via network 106 and/or can be further combined and/or separated. For ease, web service system 302, users computer 322, and/or additional users computer 330 are, at times, shown separately. This is merely for ease and is in no way meant to be a limitation.

Further, any element of web service system 302, users computer 322, and/or additional users computer 330 can reside on and/or be affiliated with users computer 322, web service system 302, additional users computer 330. For example, web service system 302 can be an algorithm stored in processor readable memory that can be accessed and/or processed by a processor affiliated with users computer 322. Further still, web service system 302 can reside on and/or be affiliated with additional users computer 330. For example, web service system 302 can be an algorithm stored in processor readable memory that can be accessed and/or processed by a processor affiliated with additional users computer 330.

As shown, web service system 302, users computer 322, and/or additional users computer 330 can include, but is not limited to, at least one communication portal 101, 101', 101"; at least one user interface 103, 103', 103"; at least one user input 105, 105', 105"; at least one speaker 107, 107', 107"; at least one processor readable memory 109, 109', 109"; at least one processor 111, 111', 111"; and any other reasonable components for use in communicating information (e.g., data), storing information, and processing any form of information.

In some instances, user interface 103, 103', 103" and user input 105, 105', 105" can be substantially the same. For example, user interface 103, 103', 103" and user input 105, 105', 105" can be combined as a touch distribution system. The touch distribution system can be a display that can detect the presence and location of a touch within the distribution system area.

In exemplary embodiments, web service system 302, users computer 322, and/or additional users computer 330 can be and/or include, for example, computer, server, tablet, and smartphone, to name a few. Network 106 can be a private network, public network, the Internet, any combination and/or separation thereof, and/or any other network.

Figure 2:
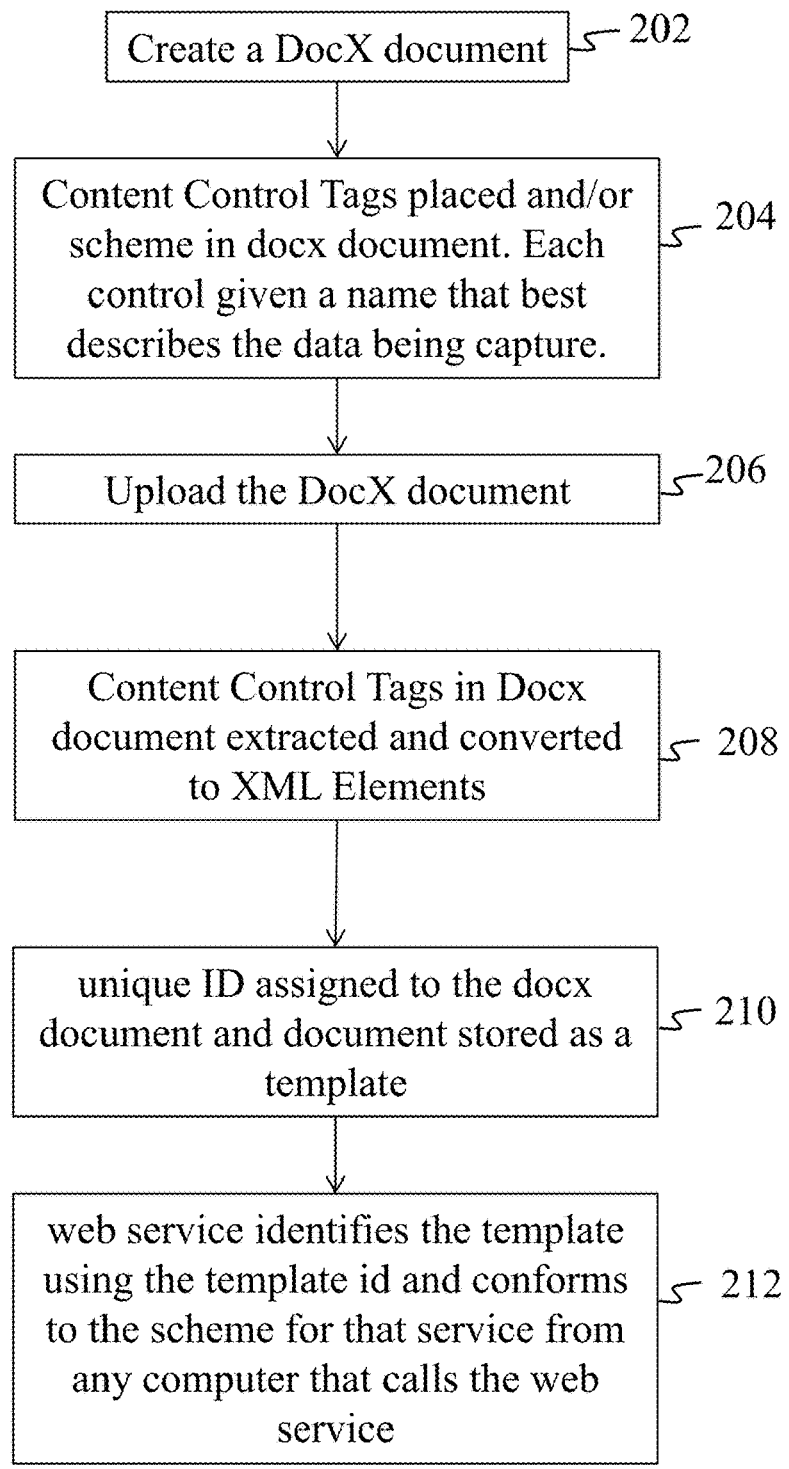
FIG. 2 is a flow chart illustrating various steps for converting an XML-based format document into a common XML format and generates a unique number and stores that XML format by that number for later retrieval by the data submission web service to collect, validate and store data that is unique to the conversation and conforming to the template's structure, in accordance with exemplary embodiments of the present disclosure.

Referring to FIG. 2, in exemplary embodiments, using web service system 302, users computer 322, and/or additional users computer 330 the systems and methods can convert XML-based format documents into templates, store templates, manage templates, generate XML Schema Definition (XSD) & Extensible Markup Language (XML) specifications, generate documents, and/or allow templates to be accessed and/or populated. By way of example, at step 202, a DOCX document can be created by a user. Further, at step 204, in the DOCX document the user can include a scheme in the document and/or the user can place content control tags in the DOCX document. The scheme and/or content control tags can include embed images, fonts, and/or other formatting features that can be later used in a template generated from the DOCX document. provide users with on demand templates and/or DOCX and/or PDFs that can be automatically generated using the web service.

Figure 3:
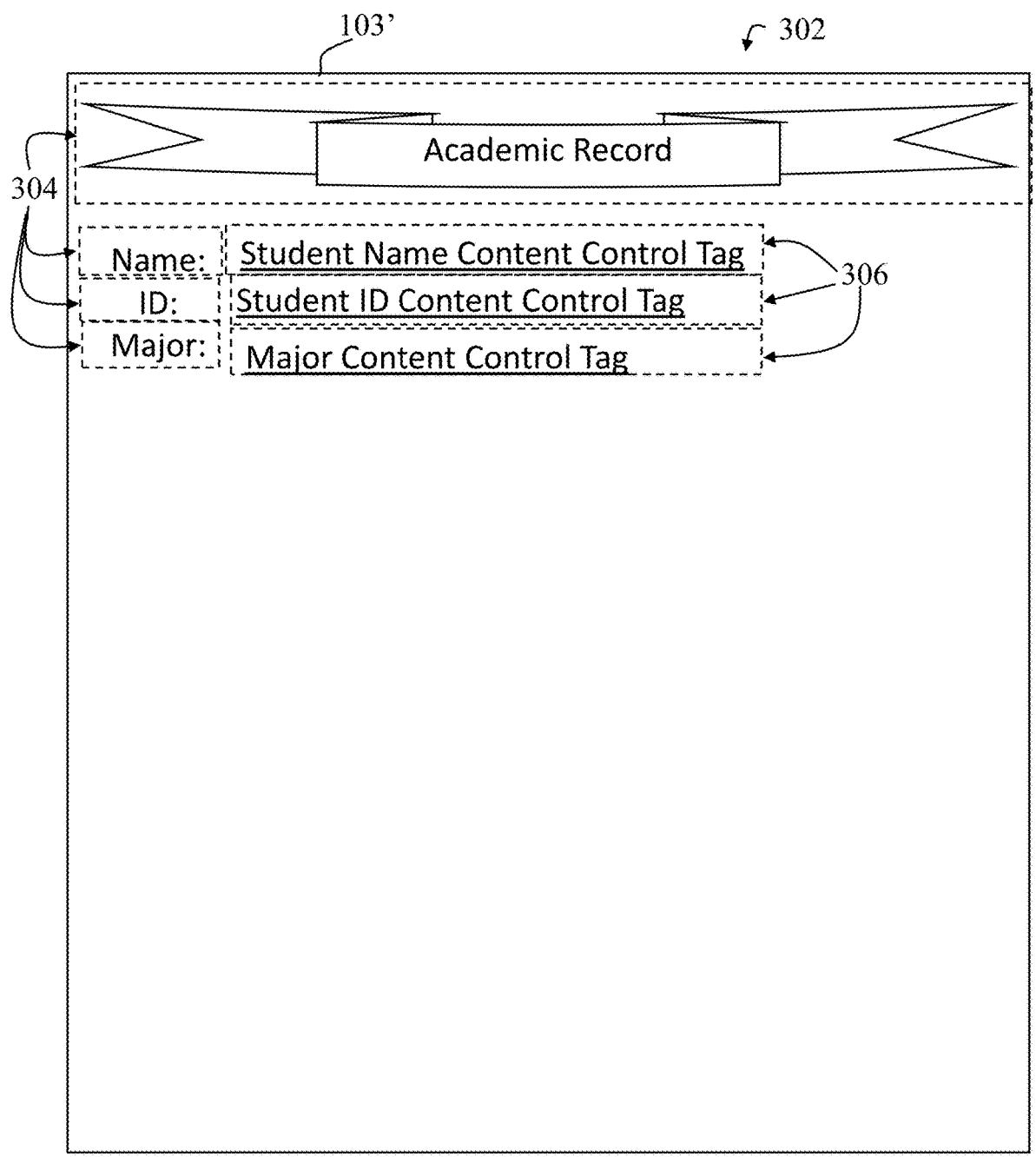
FIGS. 3-4 illustratively depict XML-based format documents, in accordance with exemplary embodiments of the present disclosure.

By way of example, referring to FIG. 3, in exemplary embodiments, a DOCX document that may be used for a template 302 (e.g., academic record template 302) can include scheme information 304 that may remain the same when the template is generated and/or content control tags 306 that can be populated when the template is generated. In exemplary embodiments, content control tags 306 can be populated by a document generation agent after the data has been collected, validated and stored by the web service (e.g., web service system 302) using XML elements from users computer 322 and/or any additional users computer 330. In exemplary embodiments, scheme information 304 can be generated by the web service (e.g., web service system 302) in response to requests, information, and/or data from and/or affiliated with users computer 322 and/or any additional users computer 330. Using template 302, scheme information 304 was constructed into a common format upon upload that that generated a unique schema ID that the web service is able to reference any time a user submits data to the invention.

In exemplary embodiments, the systems and methods can produce XSD and XML specifications and/or any other file specification, from content control tags (e.g., text control tags) located within template header, footer and body. In exemplary embodiments, content control tags are populated by the document generation agent after the web service receives, validates and stores the XML for a specified template's Id.

Figure 4:
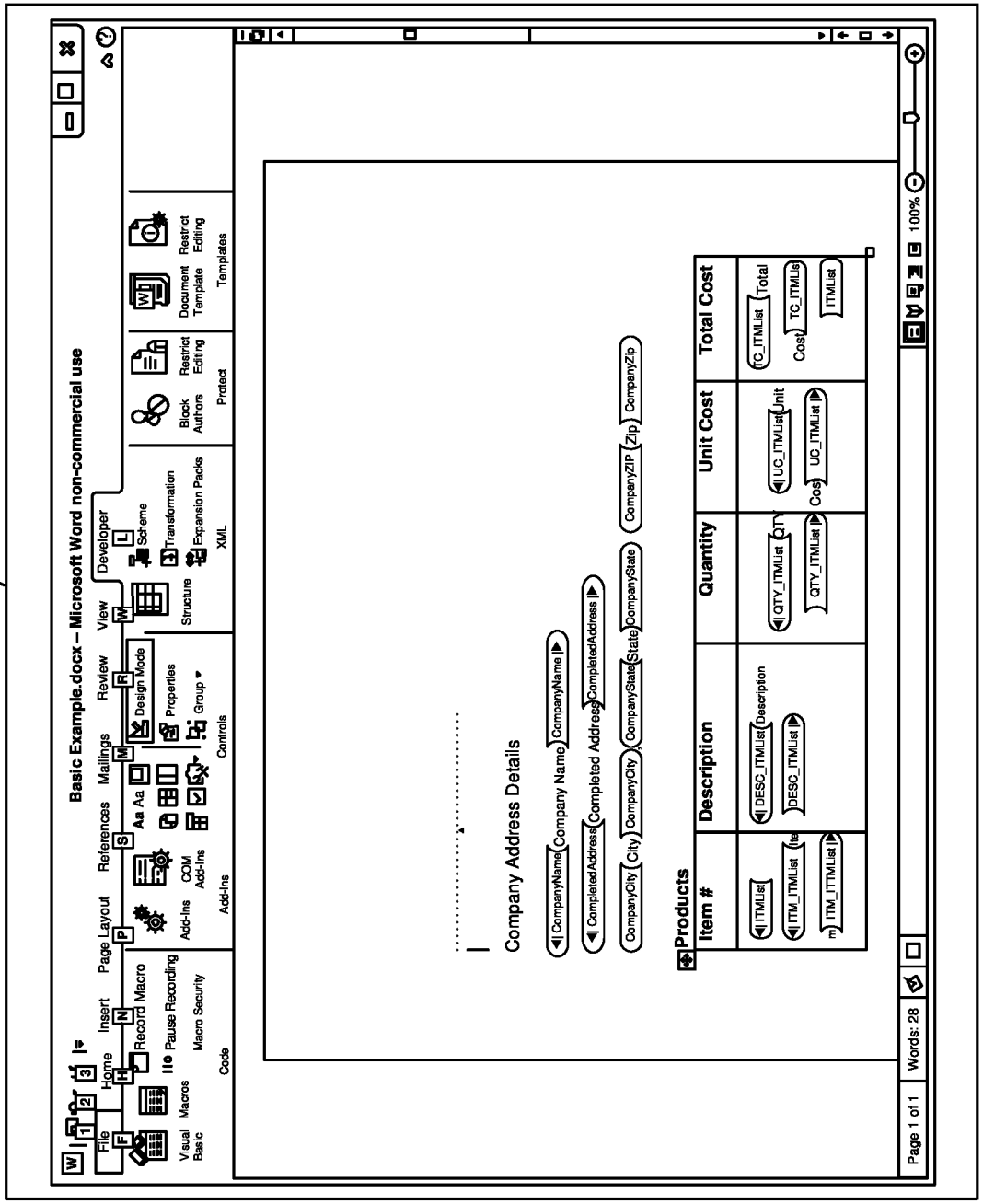

Referring to FIG. 4, in exemplary embodiments, individual content control tags can follow a naming scheme. By way of example, the naming scheme can be such that the individual content control tag may start with a letter and/or may only contain letters and numbers for the remainder of the name. Content control tags can be named and/or viewable in user interface 103'. By way of example, as displayed in FIG. 4, CompanyName, CompanyAddress, CompanyCity, CompanyState and CompanyZip illustrate individual content control tags (e.g., individual text control names).

In exemplary embodiments, repeating content control tags (e.g., field text controls) can follow a naming scheme. By way of example, the naming scheme for repeating content control tags may require them include an outer content control tag (e.g., outer text control). The outer content control tag may require text indicating it is outer content control tag and/or identifying an aspect of the outer content control tag. For example, an outer content control tag for lists may contain "list" as part of the name.

In exemplary embodiments, content control tags may include restrictions and/or be restricted from the use of some text, numerals, nomenclature, etc. For example, content control tags may be restricted from using the term "Id". By way of example, as displayed in FIG. 4, repeating content control tags ITM_ITMList, DESC_ITMList, QTY_ITMList, UC_ITMList and TC_ITMList are illustrative examples depicted the content control tags ITM, DESC, QTY, UC and TC having the outer content control tag ITMList. The name of a outer content control tag can be included within the name of the content control tag (e.g., the inner text control tag) and/or separated by an underscore, for example, as in "DESC_ITMList."

Figure 5:
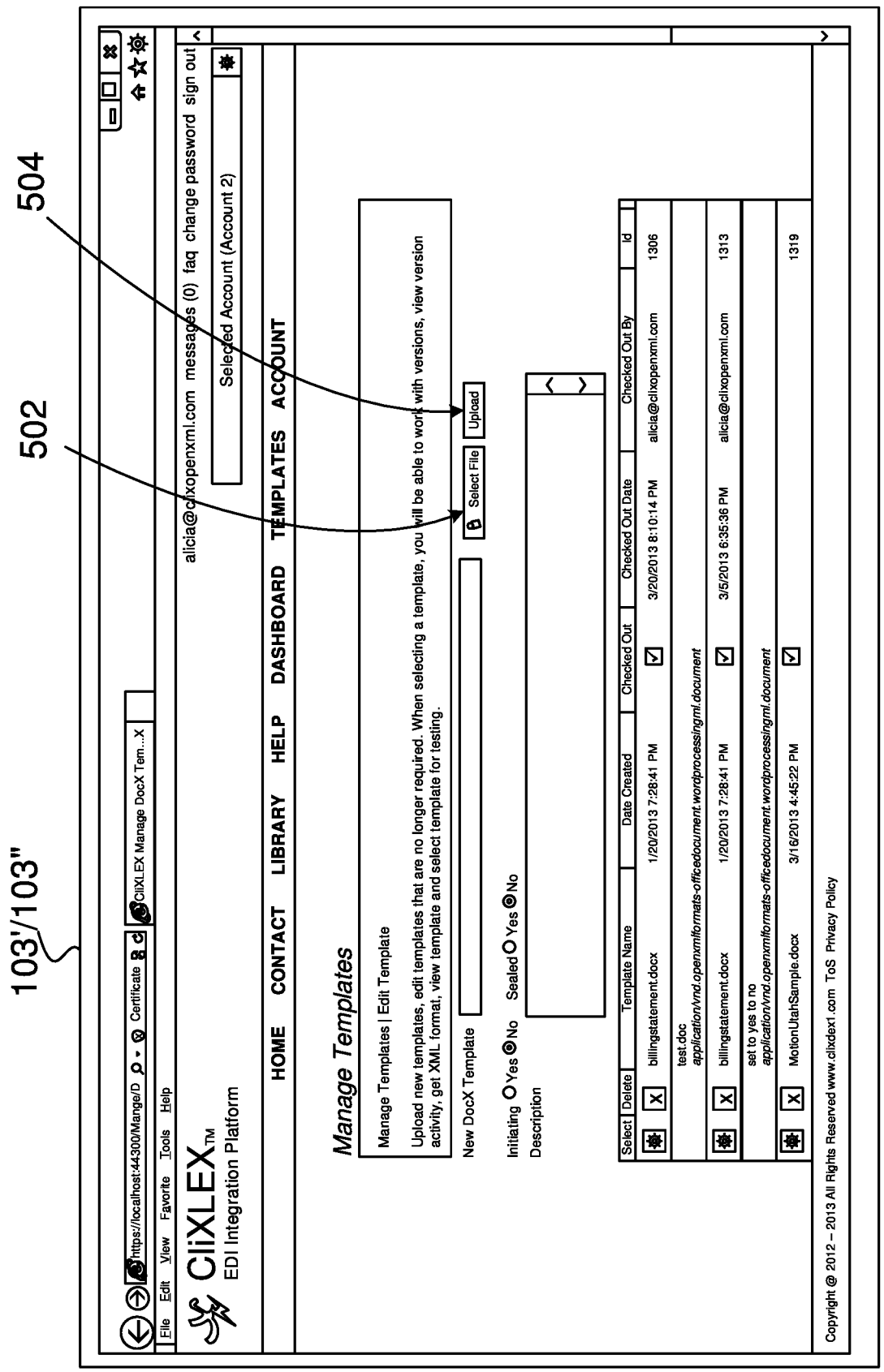

Referring to FIG. 2, in exemplary embodiments, after formatting and inserting the scheme and/or content control tags, at step 206, users can upload the DOCX document. Referring to FIG. 5, in exemplary embodiments, users can upload DOCX documents by drag and dropping the document, selecting a file to upload, and/or using any upload technique using users computer 322, additional users computer 330, and/or interface 103'/103". By way of example, DOCX documents to be used for templates can be uploaded by signing into an account, using browsing button 502 to browse to the desired DOCX document to be used for a template and selecting upload 504. It will be understood that any number of templates can be within an account and the template upon upload the invention becomes a learned and stored for as the templates structure is formatted into a common XML format that the web service, when retrieving the structure by schema ID adapts to that templates structure and is able to validate the contents of a client's request to the web service for that schema's ID.

Referring to FIG. 2, in exemplary embodiments, at step 208, content control tags can be extracted from the document and converted to XML elements.

In exemplary embodiments, at step 210, a unique ID (e.g., unique number ID) can be assigned to the document and the document can be stored as a template associated with the unique ID (e.g., template ID).

In exemplary embodiments, at step 212, web services can respond to the unique ID (e.g., template ID) and conform the scheme of the template for that web service from any computer. In exemplary embodiments, the web service adapts to the caller's request by the schema ID and validates the payload of the XML during once received from another computer. Further, in exemplary embodiments, the system and methods can include validation.

Figure 6:
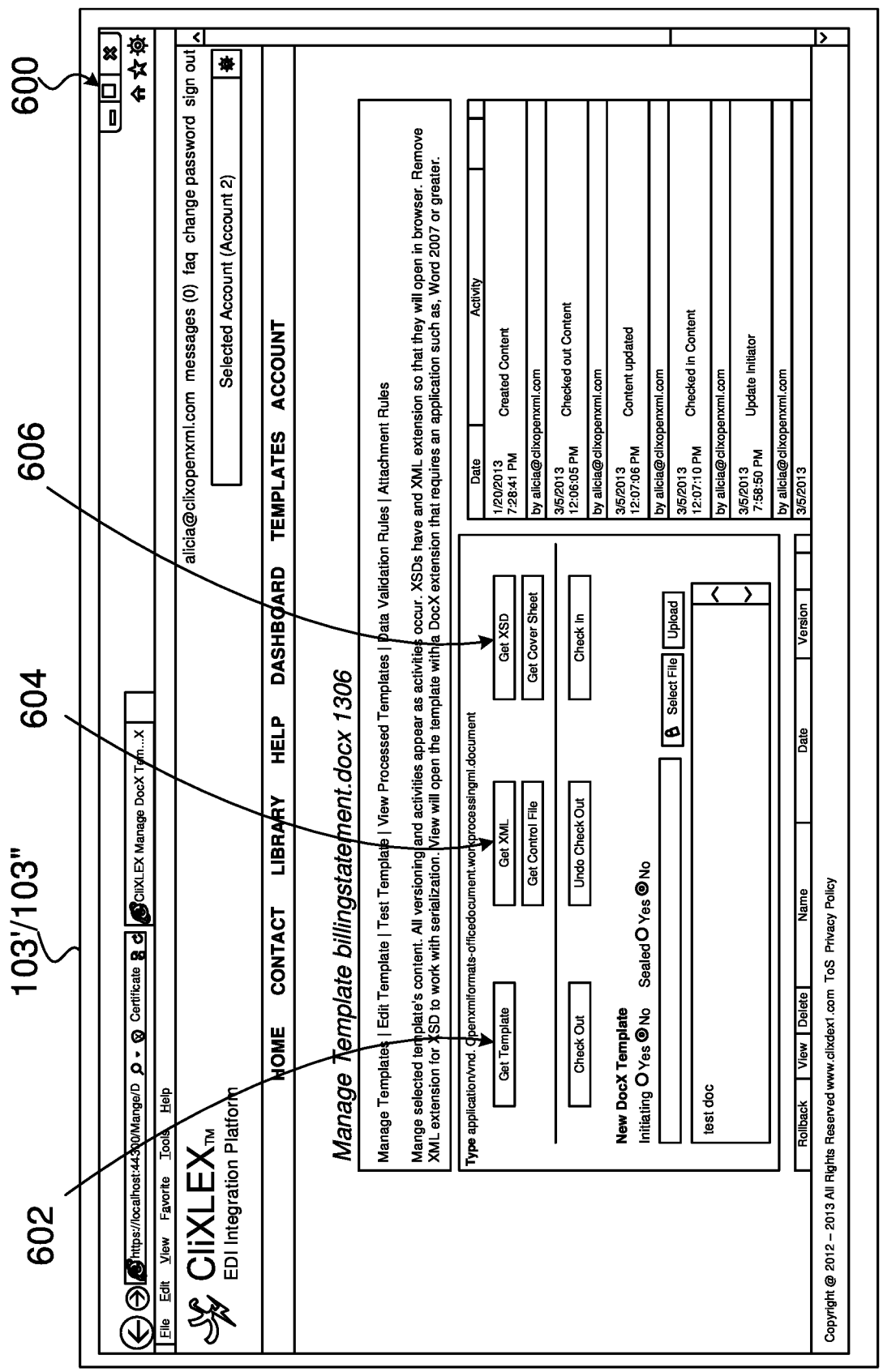

Referring to FIG. 6, in exemplary embodiments, the systems and methods can include content management and/or a command interface 600 that can be used for template maintenance. Command interface 600 and/or any content can be accessible from any computer and/or viewable in any user interface 103'/103". In exemplary embodiments, users can obtain a template, for example, selecting Get Template 602, that can also be available in a version list. Users can view the DOCX document using Microsoft Word and/or another product that reads DOCX.

In exemplary embodiments, the systems and methods can use XML to populate with data various XML elements and/or view XML elements that can merge with that template when generating documents. For example, selecting Get XML 604 users can retrieve XML specifications for templates.

In exemplary embodiments, using the systems and methods cover sheets can be retrieved and populated. By way of example, selecting Get Cover Sheet 610 can cause the systems and methods to retrieve the cover sheet to populate with information to use, for example, when automating Ascent.

In exemplary embodiments, the systems and methods can include versioning and rollback capability that can be used to rollback to any previous version of a template and/or make that version the active template. Version templates may be viewed, for example, to examine the structure of the template at various points and times.

In exemplary embodiments, the systems and methods can allow for display of various e-check ins, e-check outs, undo check outs, rollbacks, and new versions that may occurs by user and/or date. The systems and methods can also enable users to check out templates and/or upload templates and/or check in/out activities can be recorded (e.g., in the activity list) for future reference.

The flowcharts in Appendix A illustrate various aspects of the disclosure and/or can be used to accomplish various aspects of the disclosure.

It will be understood that there are numerous modifications of the illustrated embodiments described above which will be readily apparent to one skilled in the art, such as many variations and modifications of the template processing engine and/or its components including combinations of features disclosed herein that are individually disclosed or claimed herein, explicitly including additional combinations of such features. Also, there are many possible variations in the markup language, schema markup language, document template structure, environment for the illustrated embodiments. These modifications and/or combinations fall within the art to which this invention relates and are intended to be within the scope of the claims, which follow. It is noted, as is conventional, the use of a singular element in a claim is intended to cover one or more of such an element.

I claim:

1. A method for automatically instantiating expert systems comprising:
    receiving, via a communication portal of a computer comprising a memory, a storage medium, and at least one processor, a plurality of sample documents in a native word processor file format that contain text and formatting data and that have been annotated to contain one or more data elements that have been tagged with tags;
    automatically extracting, with the at least one processor, the tags from the plurality of sample documents;
    automatically storing, with the at least one processor, the extracted tags in a data structure separate from the plurality of sample documents;
    automatically generating, with the at least one processor, structural schemes from the tags, the structural schemes providing a structure for rules limiting data appropriate for the tags;
    automatically creating, with the at least one processor, document templates from the sample documents according to the structural schemes by removing the data elements from the sample documents and replacing the data elements within the sample documents with the tags from the data structure, wherein the document templates that are automatically created by the removing and replacing retain the text and formatting data in an unchanged state with the tags from the data structure in place of the data elements which have been removed;
    processing the document templates, using the at least one processor, to automatically generate a unique identifier for each of the document templates and automatically generate a unique identifier for each of the tags and a unique identifier for each of the structural schemes;
    saving the document templates in the native word processor file format with the data structure and structural schemes to the storage medium to create an expert system, wherein the document templates stored in the native word processor file format include the text and formatting data in the unchanged state with the tags from the data structure in place of the data elements which have been removed;
    receiving, via the communication portal, client data corresponding to the data structure;
    automatically validating, with the at least one processor, the client data using the unique identifiers and the rules to determine that the client data corresponds to the tags and the structural schemes in one of the document templates;
    automatically generating, with the at least one processor, a processed document using the client data and the corresponding document template; and
    storing the processed document to the storage medium.

2. The method of claim 1 wherein the validating utilizes an XML schema language to validate the client data.

3. The method of claim 1 wherein the document template is compliant with the ISO/IEC 29500:2008 file format.

4. The method of claim 1 wherein the at least one processor includes a web server.

5. The method of claim 1 wherein the receiving utilizes a web service.

6. The method of claim 5 wherein the web service is compliant with the Simple Object Access Protocol.

7. The method of claim 1 wherein the at least one processor stores received data to a relational database.

8. The method of claim 1 further comprising converting the extracted tags into elements in a markup language.

9. The method of claim 8 wherein the markup language is XML.

10. The method of claim 8 wherein the data structure includes an XML specification.

11. The method of claim 8 wherein replacing the data elements within the sample documents with the tags from the data structure comprises merging the markup language elements with respective sample documents.

12. A system for instantiating expert systems comprising:
    at least one computer comprising a memory, a storage medium, and at least one processor, wherein the at least one processor is configured to:
        receive, via a communication portal, a plurality of sample documents in a native word processor file format that contain text and formatting data and that have been annotated to contain one or more data elements that have been tagged with tags;
        automatically extract the tags from the plurality of sample documents;
        automatically store the extracted tags in a data structure separate from the plurality of sample documents;
        automatically generate structural schemes from the tags, the structural schemes providing a structure for rules limiting data appropriate for the tags;
        automatically create document templates from the sample documents according to the structural schemes by removing the data elements from the sample documents and replacing the data elements within the sample documents with the tags from the data structure, wherein the document templates that are automatically created by the removing and replacing retain the text and formatting data in an unchanged state with the tags from the data structure in place of the data elements which have been removed;
        process the document templates to automatically generate a unique identifier for each of the document templates and automatically generate a unique identifier for each of the tags and a unique identifier for each of the structural schemes;

save the document templates in the native word processor file format with the tags and the structural schemes to the storage medium to create an expert system, wherein the document templates stored in the native word processor file format include the text and formatting data in the unchanged state with the tags from the data structure in place of the data elements which have been removed;

receive, via the communication portal, client data corresponding to the data structure;

automatically validate the client data using the rules and the unique identifiers to determine that the client data corresponds to the tags and the structural schemes in the document templates;

automatically generate a processed document using the client data and the corresponding document template; and store the processed document to the storage medium.

13. The system of claim 12 wherein the document template is compliant with the ISO/IEC 29500:2008 file format.

14. The system of claim 12 wherein the at least one computer includes a web server.

15. The system of claim 12 wherein the at least one processor is further configured to convert the extracted tags into elements in a markup language.

16. The system of claim 15 wherein the markup language is XML.

17. The system of claim 15 wherein the data structure includes an XML specification.

18. The system of claim 15 wherein replacing the data elements within the sample documents with the tags from the data structure comprises merging the markup language elements with respective sample documents.

* * * * *